United States Patent
Bemis et al.

(10) Patent No.: US 6,779,366 B2
(45) Date of Patent: Aug. 24, 2004

(54) BUSHING ASSEMBLY/SUPPORT STRUCTURE ARRANGEMENT

(75) Inventors: Byron L. Bemis, Newark, OH (US); Timothy A. Sullivan, Newark, OH (US); Gregory L. Morgan, Swanton, OH (US)

(73) Assignee: Owens Corning Fiberglas Technology, Inc., Summit, FL (US)

(*) Notice: Subject to any disclaimer, the term of this patent is extended or adjusted under 35 U.S.C. 154(b) by 305 days.

(21) Appl. No.: 10/037,123

(22) Filed: Nov. 9, 2001

(65) Prior Publication Data

US 2003/0089134 A1 May 15, 2003

(51) Int. Cl.[7] .............................................. C03B 37/08
(52) U.S. Cl. .............................. 65/495; 65/492; 373/28
(58) Field of Search ........................... 65/471, 474–476, 65/481, 492, 495–499, 511, 512; 373/28

(56) References Cited

U.S. PATENT DOCUMENTS

| | | |
|---|---|---|
| 3,829,300 A | 8/1974 | Shealy |
| 3,840,358 A | 10/1974 | Whitfield, Jr. |
| 3,920,430 A | 11/1975 | Carey |
| 3,985,530 A * | 10/1976 | Hynd .......................... 65/498 |
| 3,988,135 A * | 10/1976 | Coggin, Jr. .................. 65/496 |
| 4,055,406 A | 10/1977 | Slonaker et al. |
| 4,146,373 A * | 3/1979 | Sullivan et al. ............... 65/481 |
| 4,537,609 A * | 8/1985 | McEathron .................. 65/474 |
| 4,566,888 A | 1/1986 | Schaefer |
| 4,612,027 A | 9/1986 | Marra |
| 4,664,688 A | 5/1987 | Grubka et al. |
| 4,957,525 A | 9/1990 | Gaertner et al. |
| 5,693,118 A | 12/1997 | Snedden et al. |
| 5,709,727 A | 1/1998 | Bobba |
| 5,925,164 A | 7/1999 | Dowlati et al. |
| 5,948,135 A * | 9/1999 | Grundy et al. ................. 65/495 |
| 6,196,029 B1 | 3/2001 | Melia et al. |
| 6,272,887 B1 | 8/2001 | Sullivan et al. |

* cited by examiner

*Primary Examiner*—Steven P. Griffin
*Assistant Examiner*—Eric Hug
(74) *Attorney, Agent, or Firm*—Inger H. Eckert; James L. Dottavio

(57) ABSTRACT

A bushing assembly/support structure arrangement is provided. The arrangement comprises a bushing assembly and a support structure. The bushing arrangement includes a bushing main body comprising at least first and second side walls and a tip plate extending between the side walls. The tip plate contains a plurality of orifices through which molten mineral material flows prior to being attenuated into fibers. The bushing assembly further comprises a first support rail coupled to the main body first side wall, and at least one first bracket having an intermediate member coupled to the main body first side wall. The support structure comprises a bushing frame, and at least one first support strap. The support strap has a first end fixedly coupled to the bushing frame and second end extending toward a first location on the support rail adjacent the first bracket for supporting the bushing assembly.

21 Claims, 4 Drawing Sheets

FIG. 4

BUSHING ASSEMBLY/SUPPORT STRUCTURE ARRANGEMENT

TECHNICAL FIELD AND INDUSTRIAL APPLICABILITY OF THE INVENTION

This invention relates to a bushing assembly/support structure arrangement wherein the bushing assembly is adapted to receive a molten material and includes a plurality of nozzles through which the molten material passes prior to being attenuated into continuous fibers.

BACKGROUND OF THE INVENTION

In the manufacture of continuous glass fibers, glass forming batch ingredients are added to a melter where they are heated to a molten condition. The molten glass travels from the melter to one or more bushing assemblies by way of a glass delivery system, e.g., a channel and a forehearth. Each bushing has a number of nozzles or tips through which streams of molten glass flow via gravity. Those streams are mechanically drawn to form continuous glass fibers by way of a winder or like device.

Figure 1:
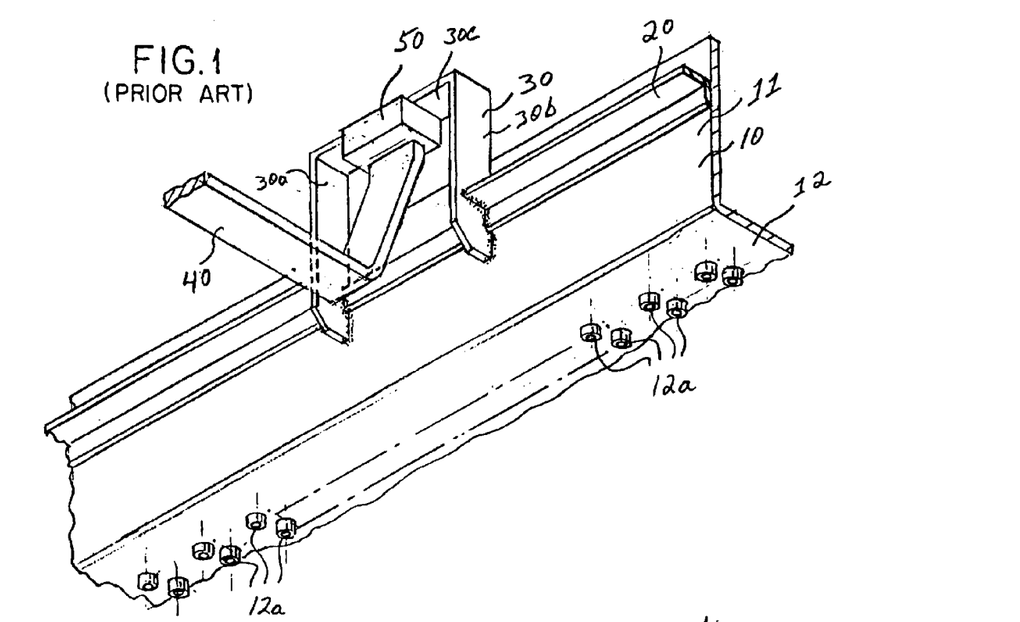
FIG. 1 is a perspective view of a portion of a prior art bushing assembly.

A prior art bushing assembly is illustrated in FIG. 1. It comprises a bushing main body 10 having a plurality of side walls 11 (only one of which is illustrated) and a tip plate 12 extending between the side walls 10. The tip plate 12 includes the nozzles 12a through which the streams of molten glass flow via gravity. A first support rail 20 is coupled to a first side wall of the bushing main body 10. A second support rail (not shown) is coupled to a second, opposing side wall of the main body 10. A plurality of C-shaped support brackets 30 (only one of which is illustrated in FIG. 1) are coupled to the first and second support rails 20 and the side walls 11 of the main body 10. Each support bracket 30 comprises outer members 30a and 30b, which are integral with and extend generally orthogonal to a generally horizontal intermediate member 30c. Ends of the outer members 30a and 30b opposite the ends integral with the intermediate member 30c are coupled to a corresponding support rail and main body side wall. A like number of support straps 40 (only one of which is illustrated in FIG. 1) are coupled to and extend from a bushing frame (not shown) and provide upwardly directed forces for supporting the bushing assembly. To insulate the support straps 40 and the bushing frame from electrical and thermal energy flowing through the main body 10, an electrically and thermally non-conductive bar 50 is provided between each support bracket 30 and corresponding support strap 40. Hence, each support strap 40 applies its upwardly directed holding force against a corresponding insulator block/support bracket combination.

It is desirable for all bushing assembly nozzles to be positioned in generally the same horizontal plane. Typically, a plurality of cooling fins (not shown) are provided below the tip plate and extend between rows of the tip plate nozzles. Heat is radiantly and convectively transferred from the nozzles and the glass streams to the fins. If one or more first nozzles are repositioned closer to a corresponding fin, such as due to deformation of the tip plate, the heat transfer rate away from those first nozzles increases. An increase in the heat transfer rate away from a given nozzle results in a decrease in the glass flow rate through that nozzle. A reduction in glass flow rate through a nozzle results in a corresponding fiber being formed having a reduced diameter. Fibers formed having reduced diameters are more likely to break. Breakage of a single fiber during a fiber forming operation results in the operation failing and being shutdown. Consequently, operating costs are increased and productively is decreased.

The bushing assembly illustrated in FIG. 1 is typically formed from an alloy of platinum or a like material and is routinely operated at temperatures exceeding 2200° F. At such high operating temperatures and after only a limited amount of time in production, one or more support brackets 30 either deform or separate from a corresponding support rail and main body side wall. Deformation or separation of a support bracket results in a portion of the perimeter of the bushing assembly main body being inadequately supported. This, in turn, can result in a portion of the tip plate being distorted. Tip plate distortion results in one or more nozzles being displaced from a nominal horizontal plane, in which all nozzles are initially positioned. As noted above, nozzle displacement can result in glass flow rate changes. Once a significant glass flow rate change has occurred at one or more nozzles, the bushing assembly must be replaced.

The dimension from the tip plate outer surface to an inner bearing surface on a support bracket intermediate member 30c should be the same for each support bracket. If the support brackets are positioned relative to the tip plate inconsistently, installation of the bushing assembly within the bushing frame/support strap assembly becomes difficult and time consuming. This is because one or more support straps must be reconfigured or machined to compensate for the incorrectly positioned support brackets such that the bushing assembly tip plate is positioned in a generally horizontal plane. Because each support bracket is manually positioned and welded to its corresponding support rail and main body side wall, it is difficult to produce a bushing assembly having support brackets consistently positioned relative to the tip plate.

It is desirable to have a bushing assembly/support structure arrangement where adequate support is provided for a bushing assembly main body over an extended period of time so as to increase the useful life of the bushing assembly. It is also desirable to have a bushing assembly/support structure arrangement where the bushing assembly can be easily installed within a bushing frame/support strap assembly.

SUMMARY OF THE INVENTION

With the present invention, an improved bushing assembly/support structure arrangement is provided. The bushing assembly comprises a bushing main body having, in one embodiment, first and second support rails fixedly coupled to opposing sides of the main body. Each support rail has first and second planar surfaces, which define a substantially L-shaped body. The support rails are accurately positioned vis-a-vis an outer surface of a tip plate. A first planar surface of each support rail is then fixedly coupled to a corresponding side wall of the main body. The bushing assembly further comprises a plurality of brackets. Each bracket comprises an intermediate member having a substantially planar face fixedly coupled along substantially its entire length to a corresponding main body side wall. Portions of each support rail extending between first and second leg members of a corresponding bracket function as bearing surfaces for corresponding support straps extending from a bushing frame. Because each support rail is fixedly coupled along substantially its entire length and each bracket is fixedly coupled along substantially the entire length of its intermediate member, each support strap contact region on the first and second support rails is robust and unlikely to distort or sag over extended periods of usage. Accordingly, the time period between bushing assembly changeovers is increased resulting in lower glass fiber production costs.

In accordance with a first aspect of the present invention, a bushing assembly is provided for containing a molten mineral material from which fibers can be attenuated. The bushing assembly comprises a bushing main body comprising at least first and second side walls and a tip plate extending between the side walls. The tip plate contains a plurality of orifices through which molten mineral material flows so as to be attenuated into fibers. The bushing assembly further comprises a first support rail coupled to the main body first side wall and at least one first bracket having an intermediate member coupled to the main body first side wall.

The first support rail may comprise first and second substantially planar surfaces integral with one another and defining an L-shaped body. The support rail first planar surface may be coupled to the main body first side wall. It is also contemplated that the first support rail may be configured so as to define other shapes in cross section, such as, by not limited to, a square, a rectangle, or a triangle.

The bracket may comprise first and second leg members and an intermediate member, with the legs members being located on opposing sides of the intermediate member and extending substantially orthogonal to the intermediate member.

Preferably, the support rail includes first and second slots. The first and second bracket leg members are received in the first and second slots and may be weldably or otherwise coupled to the support rail and the main body first side wall.

The bracket intermediate member is preferably welded to the main body first side wall along substantially the entire length of the intermediate member.

The bushing assembly preferably comprises a plurality of first brackets, each of which includes an intermediate member weldably or otherwise coupled to the main body first side wall. The bushing assembly also preferably comprises a second support rail coupled to the main body second side wall. The second side wall is positioned opposite the first side wall. The bushing assembly also comprises a plurality of second brackets, each including an intermediate member weldably coupled to the main body second side wall.

In accordance with a second aspect of the present invention, a bushing assembly/support structure arrangement is provided. The arrangement comprises a bushing assembly and a support structure. The bushing assembly includes a bushing main body comprising at least first and second side walls and a tip plate extending between the side walls. The tip plate contains a plurality of orifices through which molten mineral material flows prior to being attenuated into fibers. The bushing assembly further comprises a first support rail coupled to the main body first side wall, and at least one first bracket having an intermediate member coupled to the main body first side wall. The support structure comprises a bushing frame, and at least one first support strap. The support strap has a first end fixedly coupled to the bushing frame and second end extending toward a first location on the support rail adjacent the first bracket for supporting the bushing assembly.

The arrangement further comprises an insulating member located between the support rail first location and the support strap second end. The support strap second end applies a weight-bearing support force against the support rail first location via the insulating member.

The first support rail may comprise first and second substantially planar surfaces integral with one another and defining an L-shaped body. The support rail first planar surface is preferably coupled to the main body first side wall.

The bracket may comprise first and second leg members. The legs members are located on opposing sides of the intermediate member and extend substantially orthogonal to the intermediate member.

The first location on the support rail is located between the first and second legs of the first bracket.

The support rail includes first and second slots. The first and second leg members are received in the first and second slots and weldably or otherwise fixedly coupled to the support rail and the main body first side wall.

The bracket intermediate member is welded to the main body first side wall along substantially the entire length of the intermediate member.

The bushing assembly preferably comprises a plurality of first brackets, each including an intermediate member weldably coupled to the main body first side wall. The support structure preferably comprises a plurality of first support straps, each including a first end fixedly coupled to the bushing frame and a second end extending toward a corresponding location on the support rail for supporting the bushing assembly.

The bushing assembly further comprises a second support rail coupled to the main body second side wall, and a plurality of second brackets, each including an intermediate member weldably coupled to the main body second side wall.

DETAILED DESCRIPTION AND PREFERRED EMBODIMENTS OF THE INVENTION

Figures 2, 6:
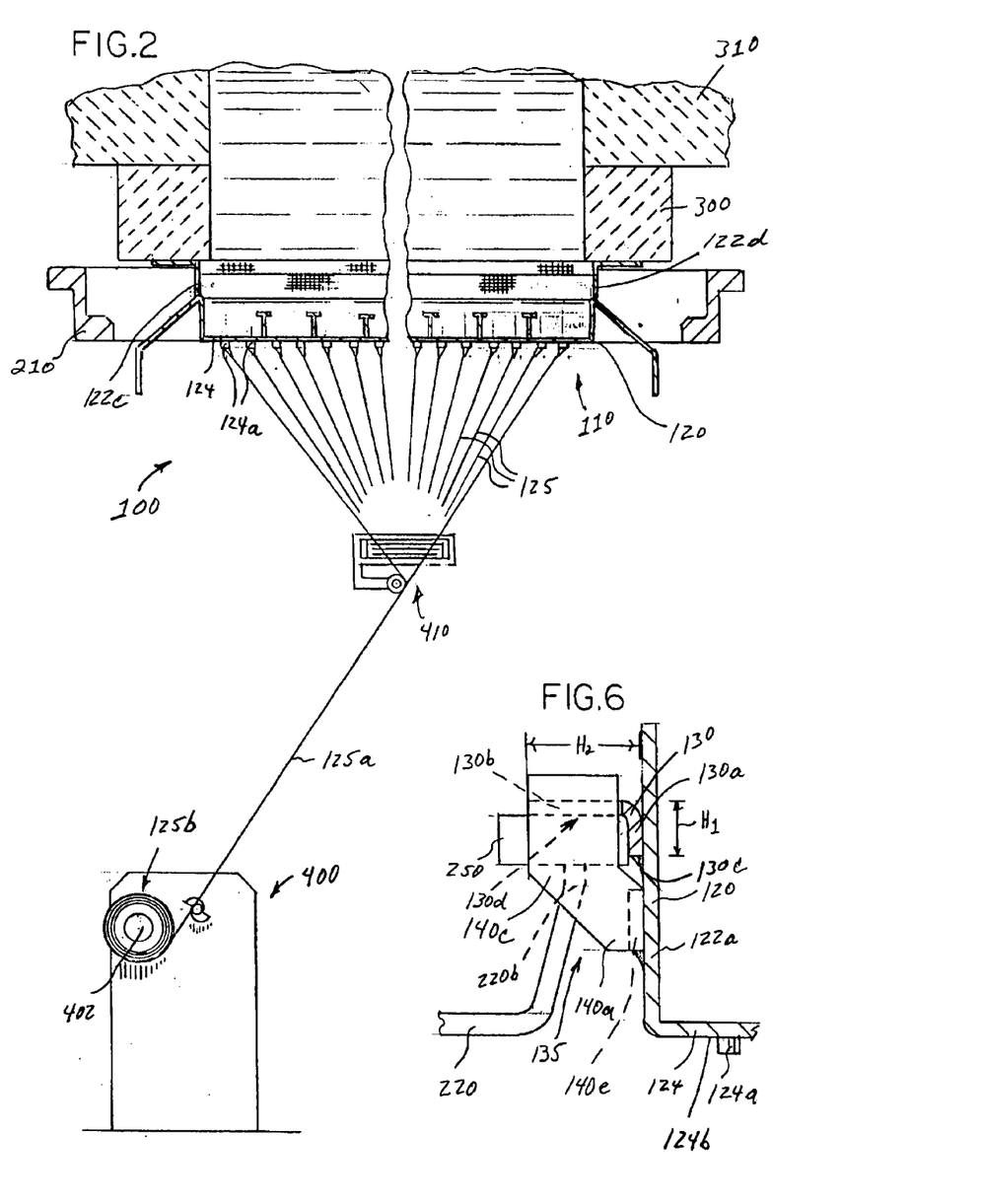
FIG. 2 is a side view, partially in cross section, of a bushing assembly/support structure arrangement for producing continuous glass filaments constructed in accordance with the present invention in combination with a conventional winder device.
FIG. 6 is a view taken along view line 6—6 in FIG. 5.
Figure 3:
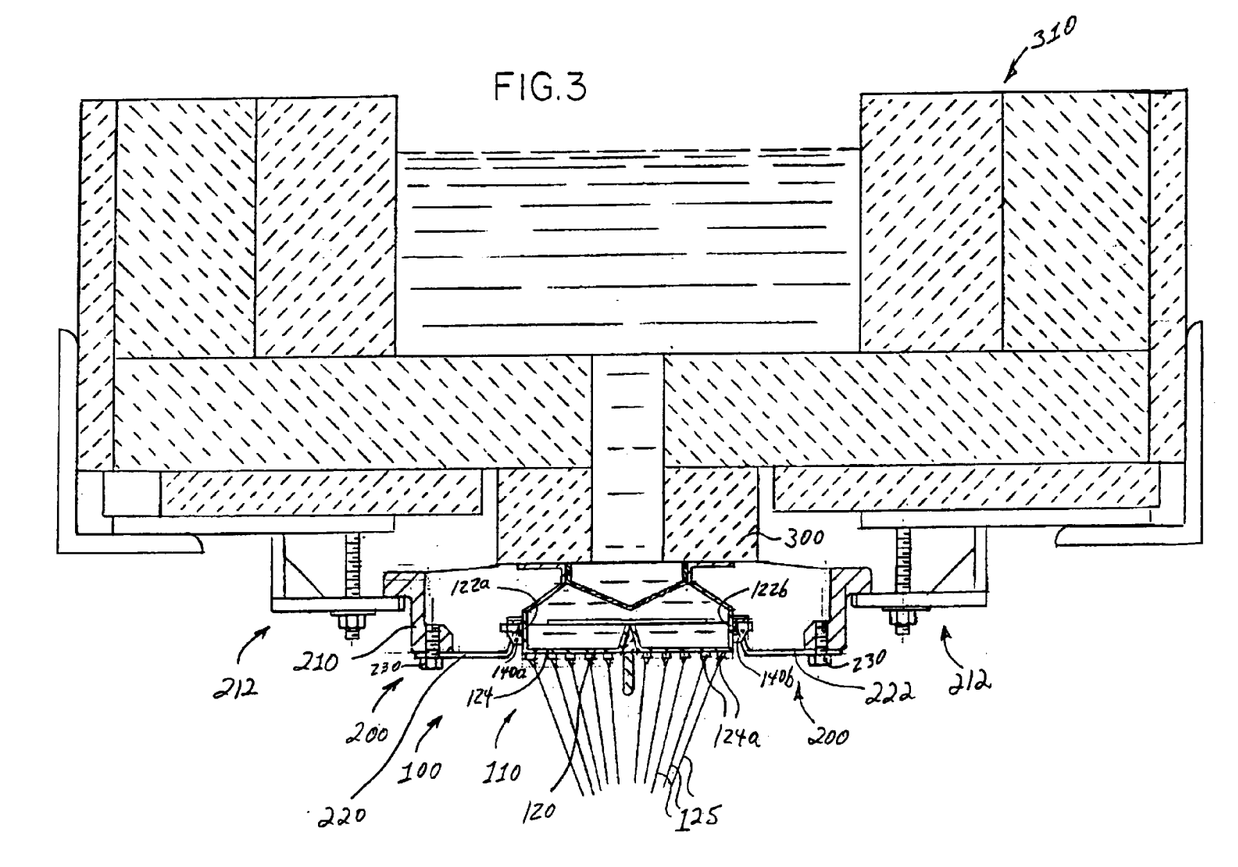
FIG. 3 is a end view, partially in cross section, of the bushing assembly/support structure arrangement illustrated in FIG. 2.

A bushing assembly/support structure arrangement 100 constructed in accordance with the present invention is illustrated in FIGS. 2 and 3. The arrangement 100 comprises a bushing assembly 110 and a support structure 200. The bushing assembly 110 includes a bushing main body 120 comprising first, second, third and fourth side walls 122a–122d and a tip plate 124 extending between the side walls 122a–122d, see also FIGS. 4–6. The main body 120 is positioned below a bushing block 300 which, in turn, is positioned beneath a conventional forehearth 310. A first stream of molten mineral material is received by the main body 120 from the forehearth 310. The forehearth 310 receives the molten mineral material from a melter (not shown). A delivery channel (not shown) may be located between the melter and the forehearth 310 to deliver the molten material from the melter to the forehearth 310. The forehearth 310 and bushing block 300 are conventional in construction and are formed from refractory materials. The mineral material preferably comprises glass but may also comprise basalt, or other fiberizable minerals or polymers.

The tip plate 124 contains a plurality of nozzles 124a (also referred to herein as orifices) through which a plurality of second streams of molten mineral material are discharged, see FIGS. 2 and 3. The second streams of material are mechanically drawn to form continuous filaments 125 via a conventional winder device 400, see FIG. 2. In the illustrated embodiment, the filaments 125 are gathered into a single continuous strand 125a after having received a protective coating or sizing composition from sizing applicator 410. The strand 125a is wound onto a rotating collet 402 of the winder device 400 to form a package 125b.

Figure 4:
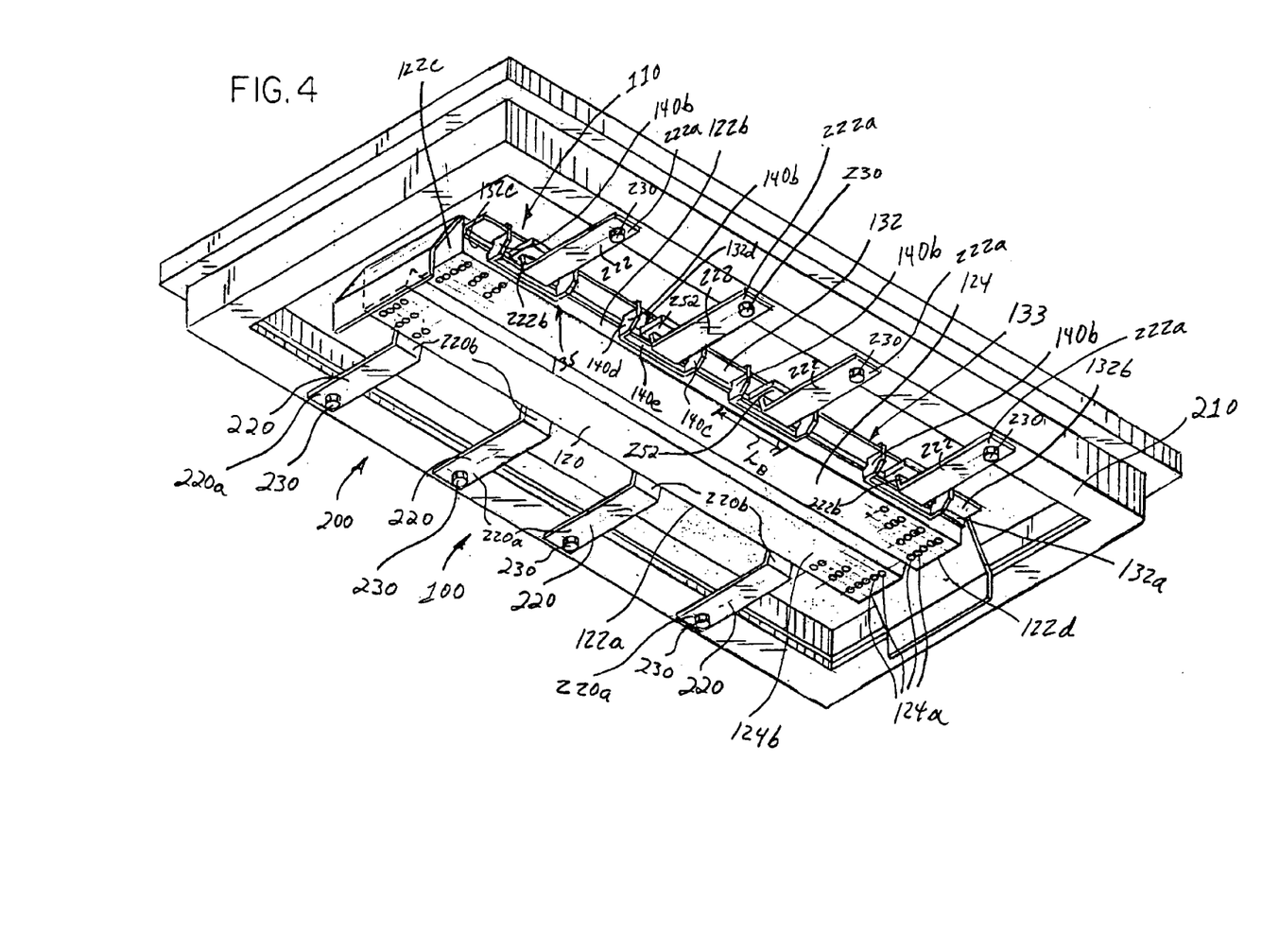
FIG. 4 is a perspective view of an underside of the bushing assembly/support structure arrangement illustrated in FIGS. 2 and 3.
Figure 5:
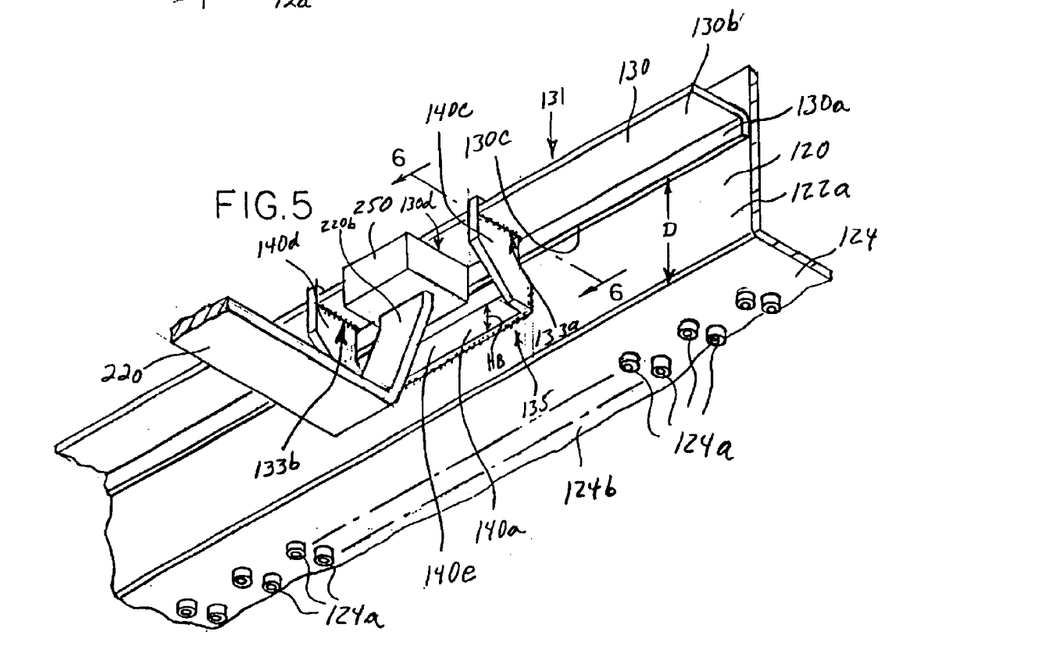
FIG. 5 is a perspective view of a portion of the bushing assembly illustrated in FIG. 24.

The bushing assembly 110 further comprises a first support rail 130 coupled to the main body first side wall 122a and a second support rail 132 coupled to the second side wall 122b, see FIGS. 4–6. The first support rail 130 comprises first and second substantially planar surfaces 130a and 130b, which are integral with one another and define a first L-shaped body 131. The second support rail 132 comprises first and second substantially planar surfaces 132a and 132b, which are integral with one another and define a second L-shaped body 133. The height $H_1$ of each first planar surface 130a, 132a may be from about 2.5 mm–13 mm (0.1 inch to about 0.5 inch) and is preferably about 5 mm (0.2 inch), see FIG. 6. The height $H_2$ of each second planar surface 130b, 132b may be from about 6.3 mm–119 mm (0.25 inch to 0.75 inch) and is preferably about 10 mm (0.4 inch), see FIG. 6. It is further contemplated that the first and second support rails 130 and 132 may be configured so as to be rectangular, square, triangular, elliptical in shape or have another geometric shaped cross section.

The first planar surface 130a of the first support rail 130 is fixedly coupled to the first side wall 122a, such as by welding the first surface 130a to the first side wall 122a along substantially the entire length of the first surface 130a. Likewise, the first planar surface 132a of the second support rail 132 is fixedly coupled to the second side wall 122b, such as by welding the first surface 132a to the second side wall 122b along substantially the entire length of the first surface 132a. Prior to welding the first and second support rails 130 and 132 to the first and second side walls 122a and 122b, the support rails 130 and 132 are carefully positioned relative to the tip plate 124 such that a distance D from an outer surface 124b of the tip plate 124 to a lower edge 130c, 132c of each support rail 130, 132 is substantially constant along the entire length of the support rail 130, 132, see FIGS. 4–6. It is also contemplated that the first planar surfaces 130a and 132a of the first and second support rails 130 and 132 may alternatively be coupled to the side walls 122a and 122b at discrete, spaced-apart locations along the lengths of the planar surfaces 130a and 132a.

The bushing assembly 110 also comprises a plurality of first brackets 140a (four in the illustrated embodiment) coupled to the first support rail 130 and the main body first side wall 122a, see FIGS. 3, 5 and 6, and a plurality of second brackets 140b (four in the illustrated embodiment) coupled to the second support rail 132 and the main body second side wall 122b, see FIGS. 3, and 4. Each bracket 140a, 140b includes first and second leg members 140c and 140d and an intermediate member 140e. The legs members 140c and 140d are located on opposing sides of the intermediate member 140e and extend substantially orthogonal to the intermediate member, see FIGS. 4–6. The intermediate member 140e of each bracket 140a, 140b is preferably weldably coupled to its corresponding main body side wall 122a, 122b along substantially the entire length of the intermediate member 140e. The intermediate member 140e of each bracket 140a, 140b may have a length LB of from about 19 mm–63.5 mm (0.75 inch to 2.5 inches) and preferably about 38 mm (1.5 inches) and a height HB of from about 2.5 mm–13 mm (0.1 inch to about 0.5 inch) and is preferably about 6.3 mm (0.25 inch), see FIGS. 4 and 5.

Each support rail 130 and 132 includes four sets of first and second slots 133a and 133b, see FIG. 5. The first and second leg members 140c and 140d of each bracket 140a, 140b are received respectively in the first and second slots 133a and 133b of the bracket's corresponding support rail 130, 132. The leg members 140c and 140d are then weldably or otherwise fixedly coupled to the bracket's corresponding support rail 130, 132 and the main body side wall 122a, 122b so as to form a rigid support entity 135, see FIGS. 4–6.

The support structure 200 comprises a bushing frame 210, which is supported by conventional metal frame apparatus 212, see FIG. 3. The support structure 200 further comprises a plurality of first support straps 220 (four in the illustrated embodiment) and a plurality of second support straps 222 (four in the illustrated embodiment). Each first support strap 220 has a first end 220a fixedly coupled to the bushing frame 210 by bolts 230, and a second end 220b extending toward a corresponding first location 130d on the first support rail 130, see FIGS. 5 and 6. The first location 130d is positioned between the leg members 140c and 140d of a corresponding first bracket 140a. Each second support strap 222 has a first end 222a fixedly coupled to the bushing frame 210 by bolts 230, and a second end 222b extending toward a corresponding second location 132d on the second support rail 132, see FIG. 4. The second location 132d is positioned between the leg members 140c and 140d of a corresponding second bracket 140b.

The arrangement 200 further comprises a plurality of first insulating members 250 (four in the illustrated embodiment) and a plurality of second insulating member 252 (four in the illustrated embodiment). Each first insulating member 250 is located between a corresponding first support rail first location 130d and a corresponding first support strap second end 220b, while each second insulating member 252 is located between a corresponding second support rail second location 132d and a corresponding second support strap second end 222b. Each first support strap second end 220b applies a weight-bearing support force against a corresponding support rail first location 130d via a corresponding first insulating member 250. Each second support strap second end 222b applies a weight-bearing support force against a corresponding support rail second location 132d via a corresponding second insulating member 252. Hence, each support strap 220 and 222 applies an upwardly directed holding force against a corresponding insulating member/support rail combination.

The first and second insulating members 250 and 252 are formed from an electrically and thermally non-conductive material, such as a mullite refractory, one of which is commercially available from L. H. Marshall Co. (Columbus, Ohio) under the product designation "MV-30 Mullite Bars". The members 250 and 252 function to insulate a corresponding support strap 220 and 222 and the bushing frame 210 from electrical and thermal energy flowing through the main body 120.

As is apparent from FIGS. 4–6, portions of each support rail 130, 132, i.e., the first and second support rail locations 130d, 132d, extending between the leg members 140c and 140d of a corresponding bracket 140a, 140b function as bearing surfaces for corresponding support straps 220, 222 extending from the bushing frame 210. Because each support rail 130, 132 is fixedly coupled to the main body 120 along substantially its entire length and each bracket 140a, 140b is fixedly coupled along substantially the entire length of its intermediate member 140e, each first and second support rail location 130d, 132d is robust and unlikely to distort, sag or creep over extended periods of usage. Accordingly, the time period between bushing assembly changeovers is increased resulting in lower glass fiber production costs.

While a certain representative embodiment and details have been shown for purposes of illustrating the invention, it will be apparent to those skilled in the art that various changes in the methods and apparatus disclosed herein may be made without departing from the scope of the invention, which is defined in the appended claims. For example, the second ends 220b and 222b of the support straps 220 and 222 may directly contact the support rail first and second locations 130d and 132d. In such an embodiment, the support straps 220 and 222 may be coated with a ceramic material sufficient to provide adequate electrical and thermal insulation for the straps 220, 222 and the bushing frame 210 or the straps 220, 222 may be made from an electrically and thermally non-conductive material.

What is claimed is:

1. A bushing assembly for containing a molten mineral material from which fibers can be attenuated, said bushing assembly comprising:

a bushing main body comprising at least first and second side walls and a tip plate extending between said side walls, said tip plate containing a plurality of orifices through which molten mineral material flows so as to be attenuated into fibers;

a first support rail coupled to said main body first side wall;

a plurality of first brackets each having an intermediate member coupled to said main body first side wall.

2. A bushing assembly as set forth in claim 1, wherein said first support rail comprises first and second substantially planar surfaces integral with one another and defining an L-shaped body.

3. A bushing assembly as act forth in claim 2, wherein said support rail first planar surface is coupled to said main body first side wall.

4. A bushing assembly as set forth in claim 3, wherein each of said brackets comprises first and second leg members, said legs members being located on opposing sides of a corresponding said intermediate member and extending substantially orthogonal to said intermediate member.

5. A bushing assembly as set forth in claim 4, wherein said support rail includes first and second slots, said first and second leg members being received in said first and second slots and being weldably coupled to said support rail and said main body first side wall.

6. A bushing assembly as set forth in claim 5, wherein at least one of said bracket intermediate members is welded to said main body first side wall along substantially the entire length of said intermediate member.

7. A bushing assembly as set forth in claim 1, wherein each intermediate member is weldably coupled to said main body first side wall.

8. A bushing assembly as set forth in claim 1, further comprising a second support rail coupled to said main body second side wall, said main body second side wall being opposite said main body first side wall.

9. A bushing assembly as set forth in claim 8, further comprising a plurality of second brackets, each including an intermediate member weldably coupled to said main body second side wall.

10. A bushing assembly/support structure arrangement comprising:

a bushing assembly including a bushing main body comprising at least first and second side walls and a tip plate extending between said side walls, said tip plate containing a plurality of orifices through which molten mineral material flows prior to being attenuated into fibers; a first support rail coupled to said main body first side wall; and a plurality of first brackets each having an intermediate member coupled to said main body first side wall; and a support structure comprising a bushing frame; and at least one first support strap having a first end fixedly coupled to said bushing frame and second end extending toward a first location on said support rail adjacent one of said first brackets for supporting said bushing assembly.

11. A bushing assembly/support structure arrangement as set forth in claim 10, further comprising an insulating member located between said support rail first location and said support strap second end, said support strap second end applying a weight-bearing support force against said support rail first location via said insulating member.

12. A bushing assembly/support structure arrangement as set forth in claim 10, wherein said first support rail comprises first and second substantially planar surfaces integral with one another and defining an L-shaped body.

13. A bushing assembly/support structure arrangement as set forth in claim 12, wherein said support rail first planar surface is coupled to said main body first side wall.

14. A bushing assembly/support structure arrangement as set forth in claim 13, wherein each of said brackets comprises first and second leg members, said legs members being located on opposing sides of a corresponding said intermediate member and extending substantially orthogonal to said intermediate member.

15. A bushing assembly/support structure arrangement as set forth in claim 14, wherein said first location on said support rail is located between said first and second legs of said one first bracket.

16. A bushing assembly/support structure arrangement as set forth in claim 14, wherein said support rail includes first and second slots, said first and second leg members being received in said first and second slots and being weldably coupled to said support rail and said main body first side wall.

17. A bushing assembly/support structure arrangement as set forth in claim 16, wherein at least one of said bracket intermediate members is welded to said main body first side wall along substantially the entire length of said intermediate member.

18. A bushing assembly/support structure arrangement as set forth in claim 10, wherein each of said intermediate members is weldably coupled to said main body first side wall, and said support structure comprises a plurality of first support straps, each including a first end fixedly coupled to said bushing frame and a second end extending toward a corresponding location on said support rail for supporting said bushing assembly.

19. A bushing assembly/support structure arrangement as set forth in claim 10, wherein said bushing assembly further comprises a second support rail coupled to said main body second side wall, said main body second side wall being opposite said main body first side wall.

20. A bushing assembly/support structure arrangement as set forth in claim 19, wherein said bushing assembly further comprises a plurality of second brackets, each including an intermediate member weldably coupled to said main body second side wall.

21. A bushing assembly for containing a molten mineral material from which fibers can be attenuated, said bushing assembly comprising:
- a bushing main body comprising at least first and second side walls and a tip plate extending between said side walls, said tip plate containing a plurality of orifices through which molten mineral material flows so as to be attenuated into fibers;
- a plurality of first brackets each having an intermediate member coupled to said main body first side wall.

* * * * *

UNITED STATES PATENT AND TRADEMARK OFFICE
CERTIFICATE OF CORRECTION

PATENT NO. : 6,779,366 B2
DATED : August 24, 2004
INVENTOR(S) : Bemis

It is certified that error appears in the above-identified patent and that said Letters Patent is hereby corrected as shown below:

Column 7,
Line 47, "A bushing assembly as act forth..." should read -- A bushing assembly as set forth... --

Signed and Sealed this

Thirtieth Day of November, 2004

JON W. DUDAS
*Director of the United States Patent and Trademark Office*